United States Patent [19]

Ivanoff

[11] 4,246,816
[45] Jan. 27, 1981

[54] SHEET CUTTING APPARATUS

[76] Inventor: Osmo O. Ivanoff, Satamakatu 7 A 4, SF-33200 Tampere 20, Finland

[21] Appl. No.: 971,927

[22] Filed: Dec. 21, 1978

[51] Int. Cl.³ .......................... B26D 7/18; B26D 7/20
[52] U.S. Cl. ........................................ 83/157; 83/373
[58] Field of Search ................................ 83/157, 373

[56] References Cited

U.S. PATENT DOCUMENTS

| Re. 28,345 | 2/1975 | Breetvelt | 83/157 |
|---|---|---|---|
| 1,565,840 | 12/1925 | Wise | 271/303 X |
| 2,742,087 | 4/1956 | Smith et al. | 83/157 X |
| 3,370,494 | 2/1968 | Schenck | 83/157 X |
| 3,600,995 | 8/1971 | Hanni | 83/157 |
| 3,841,183 | 10/1974 | Van Zyl | 83/157 |

FOREIGN PATENT DOCUMENTS 465770  3/1975  U.S.S.R. .................................. 83/157

Primary Examiner—J. M. Meister
Attorney, Agent, or Firm—Woodling, Krost & Rust

[57]     ABSTRACT

The present invention relates to a sheet cutting apparatus comprising a body; a lower blade provided with a cutting edge and supported on the body; an upper blade provided with a cutting edge and mounted on the body by connecting means so as to be scissorwise movable with respect to the lower blade; as well as support means supported adjacent to the cutting edge of the lower blade below the upper blade. The support means comprises a support plate mounted upon the support means by means of at least three pre-stressed springs fitted along the support means. The springs may be pre-stressed between support plate and support means by means of pull rods. The support means is preferably provided with a power unit for moving the support means upwards and downwards.

5 Claims, 4 Drawing Figures

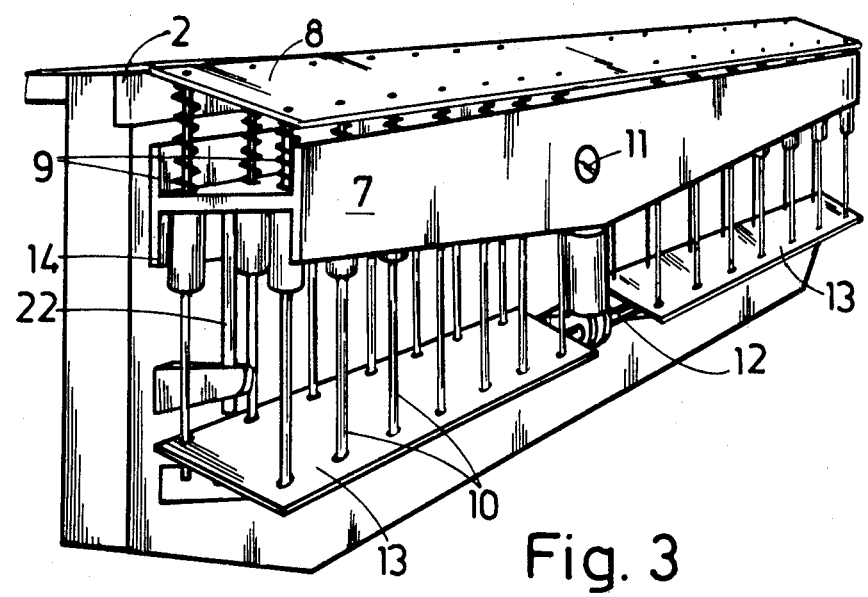
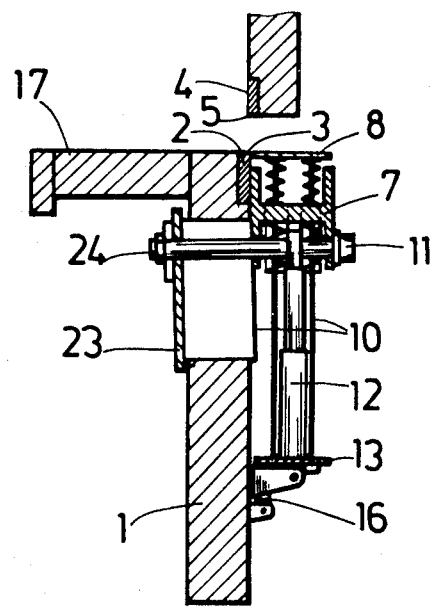
Fig. 3
Fig. 4

SHEET CUTTING APPARATUS

BACKGROUND OF THE INVENTION

The present invention relates to a sheet cutting apparatus comprising a body; a lower blade provided with a cutting edge and supported on the body; an upper blade provided with a cutting edge and mounted on the body by connecting means so as to be scissorwise movable with respect to the lower blade; as well as support means supported adjacent to the cutting edge of the lower blade below the upper blade.

When operating the sheet cutting apparatus, the upper blade is generally transferred by means of a hydraulic or mechanical system past the generally stationary lower blade tangentially thereto, the blades scissorwise shearing the sheet to be cut. In addition to the cutting effect, such a cutting operation distorts and bends the sheet to be cut. In the scissorwise cutting operation, in which a sheet of metal is sheared against a fixed blade, the article to be cut always bends according to the cutting angle, which causes permanent warpage and distortion to the sheet to be cut.

Efforts have been made to solve the problem of warpage and distortion of the sheet to be cut e.g. by providing a sheet cutting apparatus with a support means fitted adjacent to the cutting edge of the lower blade below the upper blade on its path of travel, the support means being further provided with a leaf spring fitted on top of the support means and being parallel to the cutting blades. The object of the leaf spring is to compress the cut strip of sheet against the upper blade to straighten the distortion caused by cutting. Such sheet cutting apparatus provided with a support means and a corresponding leaf spring are known e.g. from the Swedish Pat. Nos. 362,819 and 369,684 of a company called Intermenua (PYT) Ltd., Johannesburg, South Africa.

A drawback in said known apparatus provided with a support means, particularly in the case of cutters of considerable length, is the use of a pre-stressed leaf spring which causes trouble. A drawback of the leaf spring is that the support force cannot be regulated and equalized over the entire cutting length. A drawback of various support devices is that the required counter-force is too great whereby the counter-force deprives the cutting force, which accomplishes the actual cutting, of some of its effect. Furthermore, these apparatus have not produced satisfactory results, the strips of sheet remain distorted and the straightening is not sufficiently effective.

The object of the invention is to overcome the above drawbacks and to provide a sheet cutting apparatus having no such drawbacks. Particularly, the object of the invention is to develop a more effective receiving, straightening and discharging assembly for sheet cutting equipment.

SUMMARY OF THE INVENTION

According to the invention, the sheet cutter comprises a support means which is supported adjacent to the cutting edge of the lower blade below the upper blade and in its path of travel. The invention is characterized in that the support means comprises a support plate mounted upon the support means by means of at least three pre-stressed springs fitted along the support means.

The support plate is preferably supported on the support means by means of several, e.g. five, six, seven, eight, nine or ten, preferably even more pre-stressed springs. The springs are located suitably along the entire length of the cutting range of the upper blade or blades, e.g. with equal intervening spaces. The support means, which suitably constitutes a substantially planar or arcuate surface covering the length of the upper blade or the cutting range, is preferably articulated to the sheet cutter body so as to be pivotable in the direction of the blades. The support means is further preferably provided with a power unit and transfer means, such as skid rails, for moving the support means upwards and lowering it downwards. Furthermore, the sheet cutter preferably comprises a checking means mounted on the cutter body in alignment with the support means therebelow, and the springs are pre-stressed between the support plate and the support means by means of pull rods connected to the support plate and supported on the support means. The checking means can further be provided with a power unit for tilting the checking means and the support plate, that is for removing the strip of sheet. The pull rods can further be provided with control means connected, e.g. by threads, to the support means and/or stopping means in order to adjust the pre-stressing of the springs.

In tests the sheet strip receiving, straightening and discharging assembly (support means together with its springed support plate) connected to the sheet cutting apparatus and made according to the present invention has proved to be very effective, appropriate and practical. In operation, the cut strips of sheet remain straight without distortion and warpage, which is not case when using the equipment disclosed in the above-mentioned Swedish patent publications. In the sheet cutting apparatus of the present invention, the separate, adjustable support plate springs ensure even retaining force regardless of the cutting range of the machine. By providing the apparatus with spring control means, the spring force can be adjusted as desired when the springs e.g. tend to fatigue as the time passes. With the checking means articulated to the body and provided with a power unit, the tilting of the support plate is accomplished by means of the springs and said tilting pivot as well as power unit. By articulating the support means to the body at the middle point thereof, the resisting force caused by the springs through the support plate on the upper blade is at its smallest in the beginning of the cutting operation, at which time the cutting itself requires the greatest possible force.

BRIEF DESCRIPTION OF THE DRAWINGS

In the following detailed description the invention will be further illustrated but not limited by means of various embodiments with reference made to the attached drawings, in which:

FIG. 3 shows the same sheet cutter as FIG. 2 with the support plate now tilted for removing the cut strip of sheet, and FIG. 4 is a sectional view along the line IV—IV in FIG. 2.

DESCRIPTION OF THE PREFERRED EMBODIMENTS

Figure 1:
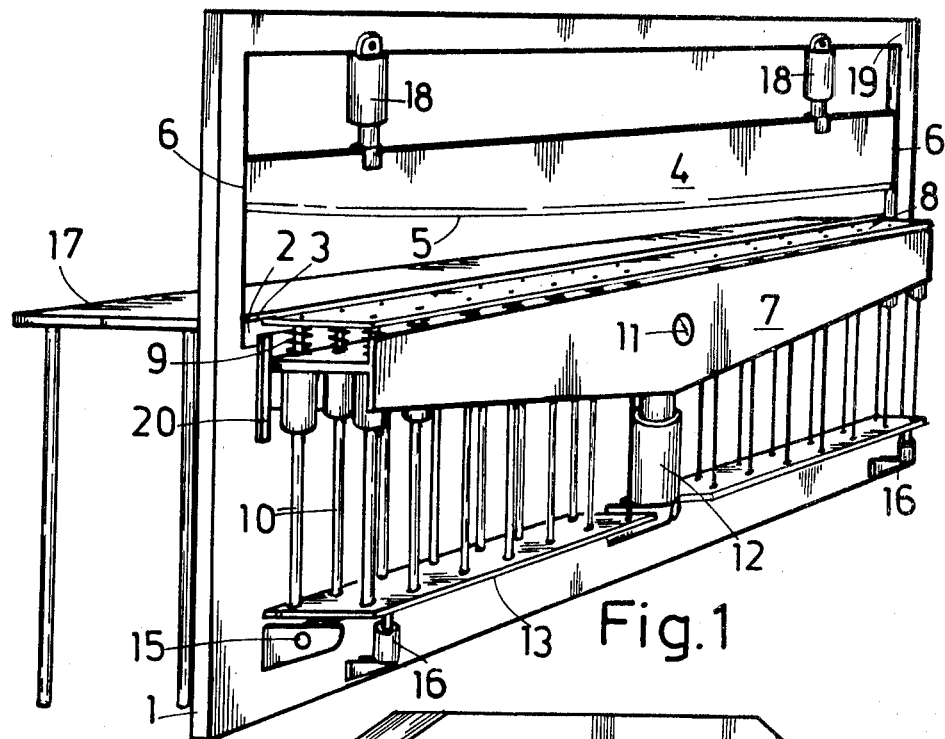
FIG. 1 is a perspective illustration of a sheet cutter according to the invention provided with a table and support means.

Referring to FIG. 1, the sheet cutter of the invention comprises a body 1, a lower blade supported on the body and provided with an edge 3, an upper blade 4 mounted on the body by means of connecting means 6 and provided with a cutting edge 5, and a support means 7 supported on the body adjacent to the lower blades's cutting edge below the upper blade and in its path of travel, and also a table 17 for transferring the sheets to be cut between the blades. In this embodiment the upper blade 4 is connected to body 1 by skid rails, which constitute said connecting means 6, in such a manner that the upper blade is movable in up-down direction by means of hydraulic cylinders 18 on a frame 19.

According to the invention the support means 7 comprises a support plate 8 mounted on the support means of at least three, in FIG. 1 more than ten pre-stressed springs 9 mounted in two rows along the support means. Thus, the elongate support plate 8 is supported parallel to the lower blade's 2 cutting edge 3 along its edge adjacent to as well as its edge away from the lower blade resiliently on the support means 7 by a plurality of pre-stressed coil springs 9. Support means 7, together with its support plate 8 as well as with the springs 9 supporting the latter, preferably extends over the whole length of cutting blades 2, 4 at least covering the length of the cutting range of the blades (this means the distance through which the cutting blades are scissorwise tangential to each other during the cutting operation.)

Referring further to FIG. 1, support means 7 is articulated to the cutter body 1 by means of a pivot 11 so as to be pivotable in the direction of lower blade 2. In addition, support means 7 is provided with a power unit, i.e. a hydraulic cylinder 12 supported on the body and said pivot 11 for moving the support means upwards and downwards. The cutter further comprises a plate-like checking means 13 supported on the body 1 in alignment with and below the support means 7, the support plate 8 being supported on the support means 7 by coil springs 9 fitted therebetween and pre-stressed by pull rods 10 connected to the support plate and supported on the checking means. Checking means 13 is further articulated to body 1 by means of a tilting pivot 15 so as to be pivotable in the direction perpendicular to the lower blade 2, and the checking means is provided with a power unit 16, i.e. hydraulic cylinders, for tilting the checking means and therefore support plate 8 away from the lower blade by means of these pull rods 10. For adjustment of the pre-stressing of springs 9 and for setting the support plate 8 to desired height according to the table 17 and the lower blade 2, the pull rods 10 are provided with control means 14, such as checks provided with threads, which support the pull rods passing through the checking means 13 against the lower surface of the checking means permitting free downward movement for the pull rods.

Support means, together with its support plate 8, is mounted on the body 1 by means of skid rails 20 permitting up-down movement and, at the pivot point 11, by means of the corresponding skid attachment, or by means of a slide member illustrated later in connection with FIG. 4.

Figure 2:
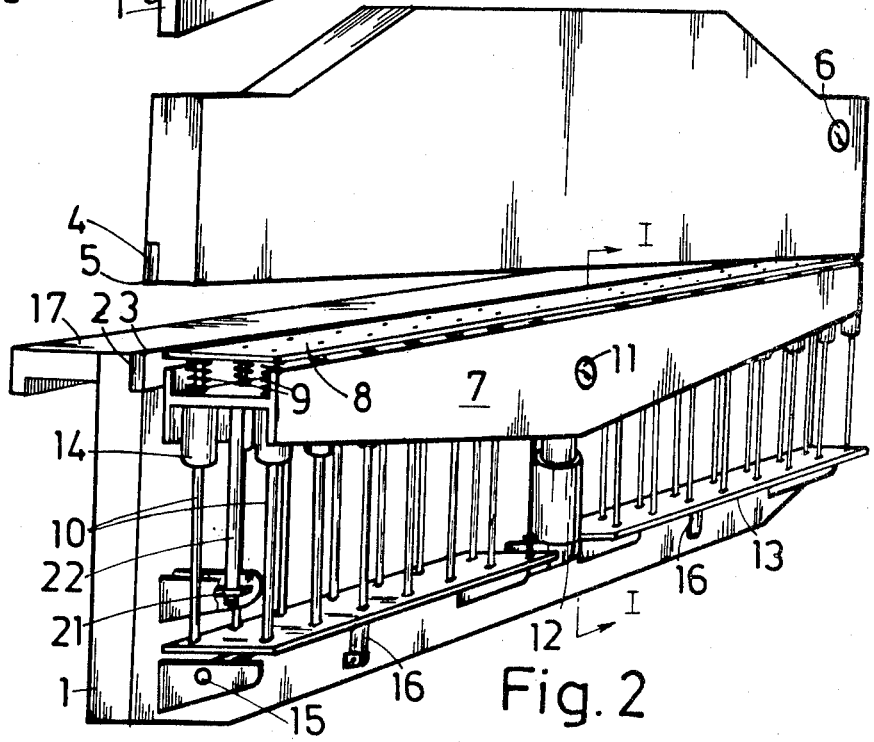
FIG. 2 is also a perspective view of another cutter according to the invention parallel to the support plate table and as extension thereof for cutting.

In the sheet cutting apparatus illustrated in FIGS. 2-4 the support means 7 is provided with support bushings 14, on which the lower ends of coil springs are supported and which are threaded to said support means for adjustment of pre-stressing of the coil springs. Pull rods 14 are freely movable in the openings formed in bottoms of said support bushings, i.e. control means 14. Referring further to FIG. 2, the upper blade 4 is connected to the body 1 (the upper portion of the body is not shown in the fig.) by a connecting means, i.e. a pivot 6, so as to be pivotable in the direction of the lower blade 2. Support means 7 is further supported on the body 1 by means of an arm member 22 connected at its upper end to the support means, the lower end of said arm member being mounted on the body 1 by means of a slide means giving the arm member free sliding downwards, upwards to predetermined limit, and pivoting movement.

When operating the sheet cutter of FIGS. 1-4, the support means 7 is resiliently supported by a hydraulic cylinder 12. The counter force caused by cylinder 12 also acts on springs 9 through pull rods 10 and support plate 8 in such a manner that, in the beginning of the cutting operation, all springs are stressed to certain length and so as to correspond to certain plate retaining force. The force produced by the hydraulic cylinder 12 counter-acts against the shearing force in the same plane therewith. One end of cylinder 12 is articulated to pivot 11 and the other end on the body 1, e.g. by a pivot axle 15 of checking means 13. Thus, there is obtained the advantage that the receiving assembly constitutes a unit which can be fitted in any sheet cutter.

With springs 9 covering the length of and acting as retaining springs for support plate 8 and with the support plate acting as a shield plate for springs, the present construction is advantageous over e.g. the cutter disclosed in the above-mentioned Swedish patents in that, instead of a plurality of hydraulic cylinders 12, it employs just one hydraulic cylinder whose resisting force varies in different points of the cutting line, in other words, the support means, together with its support plate, yields according to the progress of the cutting operation.

According to FIG. 2, support plate 8 can be tilted by means of checking means 13, tilting pivot 15, and power unit 16 using pull rods 10 for removing the cut strip of sheet off the support plate onto e.g. a conveying platform. After the cutting operation the pressure in cylinder 12 is dropped, whereby springs 9 press the support means 7 downwards. Thereafter, the plate-like checking means 13 is tilted by means of power units 16 whereby the support plate 8 inclines. The movements of support means, i.e. pivoting in the direction of cutting blades and up-down movement, are accomplished by means of a slide member 13 shown in FIG. 4 mounted slideably on the body 1 and provided with guide surfaces for body 1 and support means 7. The pivot axle 11 is connected to said slide member 23 by means of attachment members 24.

The examples presented are intended to depict the invention without limiting it in any way. Thus, the embodiments of the invention may vary within the following claims. Thus, springs 9 can, for example, be fitted in one or two or even more rows below the support plate 8 to support it.

What I claim is:

1. A sheet cutting means comprising a body, a lower blade provided with a cutting edge and supported on the body, an upper blade provided with a cutting edge and mounted on the body by means of a connecting means so as to be scissorwise movable with respect to the lower blade, a support means supported adjacent to the lower blade cutting edge below the upper blade, the support means articulated to the body by means of a pivot so as to be pivotable in the direction of the lower blade, a support plate mounted upon the support means, a checking means fitted on the body in alignment with and below the support means, the support plate being supported on the support means by coil springs fitted between the support plate and support means and the coil springs are pre-stressed by means of pull rods connected to the support plate and supported on the checking means.

2. Sheet cutting apparatus according to claim 1, wherein the pull rods are supported on the checking means by control means.

3. Sheet cutting apparatus according to claim 1, wherein the checking means is articulated to the body by means of a tilting pivot so as to be pivotable in perpendicular direction to the lower blade, and the checking means is provided with a power unit for tilting the checking means away from the lower blade.

4. An improvement for a sheet cutting apparatus having a body, a lower blade supported on the body and an upper blade mounted on the body by means of a connecting means so as to be scissorwise movable with respect to the lower blade, the improvement comprising a support means supported adjacent to the lower blade below the upper blade, the support means articulated to the body by means of a pivot located in the center of the support means so the support means is pivotable in the direction of the lower blade, a support plate mounted upon the support means, a checking means fitted on the body in alignment with and below the support means, the support plate being supported on the support means by coil springs fitted between the support plate and the support means and the coil springs are pre-stressed by means of pull rods connected to the support plate and supported on the checking means.

5. In a sheet cutting apparatus having a body, a lower blade, an upper blade and a support plate the improvement of a support means, said support means having a center, said center of said support means being pivotally connected to the body of the sheet cutting apparatus, said support plate being supported on said support means by springs fitted between said support plate and said support means, a checking means, said checking means fitted on the body in alignment with and below the support means and means to prestress said springs by means of pull rods connected between said support plate and said checking means.

* * * * *